United States Patent
Chen et al.

(10) Patent No.: US 12,494,849 B2
(45) Date of Patent: Dec. 9, 2025

(54) OPTICAL DETECTION SYSTEM, VEHICLE COMMUNICATION SYSTEM HAVING THE SAME AND OPERATING METHOD THEREOF

(71) Applicant: HON HAI PRECISION INDUSTRY CO., LTD., New Taipei (TW)

(72) Inventors: Jun-Da Chen, New Taipei (TW); Yu-Heng Hong, New Taipei (TW); Fu-He Hsiao, New Taipei (TW); Kuo-Fong Tseng, New Taipei (TW); Hao-Chung Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 357 days.

(21) Appl. No.: 18/454,776

(22) Filed: Aug. 23, 2023

(65) Prior Publication Data

US 2024/0405885 A1    Dec. 5, 2024

(30) Foreign Application Priority Data

Jun. 5, 2023    (TW) .................. 112120914

(51) Int. Cl.
 *H04B 10/69* (2013.01)
 *H04B 10/112* (2013.01)
(52) U.S. Cl.
 CPC ....... *H04B 10/697* (2013.01); *H04B 10/1123* (2013.01)
(58) Field of Classification Search
 CPC ............................................. H04B 10/11–1129
 See application file for complete search history.

(56) References Cited

U.S. PATENT DOCUMENTS

| | | | |
|---|---|---|---|
| 11,022,689 B2 | 6/2021 | Villeneuve et al. |
| 11,466,316 B2 | 10/2022 | Rothberg et al. |

(Continued)

FOREIGN PATENT DOCUMENTS

| | | |
|---|---|---|
| CN | 114937720 A | 8/2022 |
| TW | 1755697 B | 2/2022 |
| TW | 202301765 A | 1/2023 |

OTHER PUBLICATIONS

Li Wenjun et al., "A Wireless and Real-Time Monitoring System Design for Car Networking Applications", Hindawi Publishing Corporation International Journal of Antennas and Propagation, vol. 2013, Article ID 298543, pp. 1-5.

(Continued)

*Primary Examiner* — Nathan M Cors
(74) *Attorney, Agent, or Firm* — CKC & Partners Co., LLC

(57) ABSTRACT

An optical detection system includes a first optical transmitter module, a first optical receiver module, a second optical receiver module, and a second optical transmitter module. The first optical transmitter module is configured to emit detection light. A first light transmitter of the first optical transmitter module includes a photonic crystal surface emitting laser. A first metasurface of the first optical transmitter module is located above the first light transmitter. The second optical receiver module is configured to receive first communication light. The second communication light has information of signal light and information in first communication light. A second light transmitter of the second optical transmitter module includes a photonic crystal surface emitting laser. A second metasurface of the second optical transmitter module is located above the second light transmitter.

20 Claims, 8 Drawing Sheets

(56) References Cited

U.S. PATENT DOCUMENTS

| | | | | |
|---|---|---|---|---|
| 2008/0317476 | A1* | 12/2008 | Tsuji | H04B 10/1125 398/140 |
| 2015/0244459 | A1* | 8/2015 | Lindsay | H04B 10/1129 398/130 |
| 2016/0327648 | A1* | 11/2016 | Lipson | G01S 17/74 |
| 2018/0196139 | A1* | 7/2018 | Brown | G01S 17/10 |
| 2020/0284883 | A1 | 9/2020 | Ferreira et al. | |
| 2021/0006332 | A1* | 1/2021 | Pandit | H04B 10/11 |
| 2022/0035009 | A1* | 2/2022 | Okada | G01S 17/86 |
| 2023/0204782 | A1* | 6/2023 | Park | G01S 7/4815 356/4.01 |
| 2024/0014899 | A1* | 1/2024 | Takata | H04B 10/1123 |

OTHER PUBLICATIONS

Jun Steed Huang et al., "Sending Safety Video over WiMAX in Vehicle Communications", Future Internet, Oct. 31, 2013, vol. 5, ISSN 1999-5903, DOI: 10.3390/fi5040535, pp. 535-567.

Adam Ar Rosyid Aditya et al., "Detection Brake Condition of Vehicle Using Fuzzy Logic in Visible Light Communication," 2020 6th International Conference on Science in Information Technology (ICSITech), 2020, pp. 127-132, DOI: 10.1109/ICSITech49800.2020.9392048.

K. Siddiqi et al., "Visible light communication for V2V intelligent transport system," 2016 International Conference on Broadband Communications for Next Generation Networks and Multimedia Applications (CoBCom), Graz, Austria, Sep. 14-16, 2016, ISBN: 978-1-5090-2270-0, pp. 1-4.

Sabbir Rangwala, "Laser Lighting, LiFi And LiDAR—Enabling Transportation Safety and Autonomy", Forbes, Jun. 10, 2022.

Chun-Yen Peng et al.,"Performance Analyses of Photonic-Crystal Surface-Emitting Laser: Toward High-Speed Optical Communication", Nanoscale Research Letters, vol. 17, Article No. 90, 2022.

Yu-Heng Hong et al., "Modulating Light Emission Performance of PCSEL via GaN HEMT Driving Circuit", Crystals 2022, 12, 1242.

Yu-Heng Hong et al., "Progress of Photonic-Crystal Surface-Emitting Lasers: A Paradigm Shift in LiDAR Application", Crystals 2022, 12, 800.

Robert C. Devlin et al., "Arbitrary spin-to-orbital angular momentum conversion of light," Science, vol. 358, 2017, pp. 896-901.

Song Gao et al., "Dielectric Polarization-Filtering Metasurface Doublet for Trifunctional Control of Full-Space Visible Light", Laser & Photonics Reviews, 2022, DOI: 10.1002/lpor.202100603.

Kenji Ishizaki et al., "Progress in Photonic-Crystal Surface-Emitting Lasers", Photonics 2019, 6(3), 96, DOI:10.3390/photonics6030096.

* cited by examiner

OPTICAL DETECTION SYSTEM, VEHICLE COMMUNICATION SYSTEM HAVING THE SAME AND OPERATING METHOD THEREOF

RELATED APPLICATIONS

This application claims priority to Taiwan Application Serial Number 112120914, filed Jun. 5, 2023, which is herein incorporated by reference.

BACKGROUND

Field of Disclosure

The present disclosure relates to an optical detection system, a vehicle communication system and an operating method of thereof.

Description of Related Art

In the current concept of vehicle-to-everything (V2X), vehicle lighting equipment using laser as a light source can realize optical communication, thereby avoiding the problems of delay and packet loss encountered by wireless radio frequency communication in heavy traffic areas. In addition, compared with visible light communication, optical communication using a laser light source may have a longer communication distance and can be applied to the field of high-speed cruise.

At present, commercial laser components commonly used for the vehicle lighting equipment are a vertical cavity surface emitting laser (VCSEL) and a distributed-feedback laser (DFB laser) with Bragg grating. Since the manufacturing process of the two laser components is affected by the material of an active component, the size of the laser components applied to optical communication cannot be further reduced.

SUMMARY

One aspect of the present disclosure provides an optical detection system.

According to some embodiments of the present disclosure, an optical detection system includes a first optical transmitter module, a first optical receiver module, a second optical receiver module, and a second optical transmitter module. The first optical transmitter module is configured to emit detection light, and has a first light transmitter and a first metasurface located above the first light transmitter. The first light transmitter includes a photonic crystal surface emitting laser. The first metasurface is configured to increase a scattering angle of light from the first light transmitter through the first metasurface to form detection light. The first optical receiver module is configured to receive a first signal light formed by a reflection of the detection light. The second optical receiver module is configured to receive first communication light. The second optical transmitter module is configured to emit second communication light, and has a second light transmitter and a second metasurface located above the second light transmitter. The second communication light has information of a first signal light and information of the first communication light. The second light transmitter includes a photonic crystal surface emitting laser. The second metasurface is configured to determine the spatial distribution and polarization pattern of the second communication light.

In some embodiments, the second optical receiver module has a third metasurface. The third metasurface is configured for the first communication light to pass through.

In some embodiments, the third metasurface is configured to isolate a noise from the second optical receiver module.

In some embodiments, the first optical receiver module has no metasurface configured to filter the first signal light.

In some embodiments, each of the first metasurface, the second metasurface and the third metasurface has a plurality of meta-atoms. The meta-atoms are shaped like cylinders, tetragonal prisms or rectangular prisms, and have tetragonal lattices or hexagonal lattices.

In some embodiments, the optical detection system further includes an image processor. The image processor is connected to the first optical receiver module and the second optical receiver module. The image processor is configured to convert a digital signal from the first optical receiver module to a first point cloud diagram, and fuse the first point cloud diagram and a second point cloud diagram from the second optical receiver module to generate a fused point cloud diagram.

In some embodiments, the optical detection system further includes a modulator. The modulator is electrically connected to the image processor and the second optical transmitter module. The modulator is configured to code the fused point cloud diagram to the second communication light emitted by the second optical transmitter module.

In some embodiments, the first communication light received by the second optical receiver module and the second communication light emitted by the second optical transmitter module are optical vortexes, linearly polarized light, circularly polarized light or elliptically polarized light.

Another aspect of the present disclosure provides an operating method of an optical detection system.

According to some embodiments of the present disclosure, an operating method of an optical detection system includes: emitting, by a first optical transmitter module, detection light, where the first optical transmitter module has a first light transmitter and a first metasurface located above the first light transmitter, and the first light transmitter includes a photonic crystal surface emitting laser; receiving, by a first optical receiver module, signal light formed by the reflection of the detection light; receiving, by a second optical receiver module, first communication light; combining information of the signal light and information of the first communication light; and emitting, by a second optical transmitter module, second communication light, where the second communication light has information of the signal light and information of the first communication light, the second optical transmitter module has a second light transmitter and a second metasurface located above the second light transmitter, and the second light transmitter includes a photonic crystal surface emitting laser.

In some embodiments, the combining information of the signal light and information of the first communication light includes: converting, by an image processor, a digital signal from the first optical receiver module to a first point cloud diagram; and fusing the first point cloud diagram and a second point cloud diagram from the second optical receiver module to generate a fused point cloud diagram.

In some embodiments, the emitting, by a second optical transmitter module, second communication light includes: coding, by a modulator, the fused point cloud diagram to the second communication light emitted by the second optical transmitter module.

In some embodiments, the emitting, by a second optical transmitter module, second communication light enables the second communication light to serve as first communication light of another optical detection system.

Another aspect of the present disclosure provides a vehicle communication system.

According to some embodiments of the present disclosure, a vehicle communication system includes a vehicle and an optical detection system. The optical detection system is located in the vehicle. The optical detection system includes a first optical transmitter module, a first optical receiver module, a second optical receiver module, and a second optical transmitter module. The first optical transmitter module is configured to emit detection light, and has a first light transmitter and a first metasurface located above the first light transmitter. The first light transmitter includes a photonic crystal surface emitting laser. The first metasurface is configured to increase a scattering angle of light from the first light transmitter through the first metasurface to form detection light. The first optical receiver module is configured to receive signal light formed by the reflection of the detection light. The second optical receiver module is configured to receive first communication light. The second optical transmitter module is configured to emit second communication light, and has a second light transmitter and a second metasurface located above the second light transmitter. The second communication light has information of signal light and information of the first communication light. The second light transmitter includes a photonic crystal surface emitting laser. The second metasurface is configured to determine the spatial distribution and polarization pattern of the second communication light.

In some embodiments, the second optical receiver module has a third metasurface. The third metasurface is configured for the first communication light to pass through.

In some embodiments, the third metasurface is configured to isolate a noise from the second optical receiver module.

In some embodiments, the first optical receiver module has no metasurface configured to filter the first signal light.

In some embodiments, each of the first metasurface, the second metasurface and the third metasurface has a plurality of meta-atoms. The meta-atoms are shaped like cylinders, tetragonal prisms or rectangular prisms, and have tetragonal lattices or hexagonal lattices.

In some embodiments, the vehicle communication system further includes an image processor. The image processor is connected to the first optical receiver module and the second optical receiver module. The image processor is configured to convert a digital signal from the first optical receiver module to a first point cloud diagram, and fuse the first point cloud diagram and a second point cloud diagram from the second optical receiver module to generate a fused point cloud diagram.

In some embodiments, the vehicle communication system further includes a modulator. The modulator is electrically connected to the image processor and the second optical transmitter module. The modulator is configured to code the fused point cloud diagram to the second communication light emitted by the second optical transmitter module.

In some embodiments, the first communication light received by the second optical receiver module and the second communication light emitted by the second optical transmitter module are an optical vortex, linearly polarized light, circularly polarized light or elliptically polarized light.

In the above embodiments of the present disclosure, the first optical transmitter module has the first light transmitter including the photonic crystal surface emitting laser, and the first metasurface located above the first light transmitter, the second optical transmitter module has the second light transmitter including the photonic crystal surface emitting laser, and the second metasurface located above the second light transmitter, and the manufacturing process of the metasurfaces and the manufacturing process of the photonic crystal surface emitting lasers may be integrated; therefore, the manufacturing processes of the first optical transmitter module and the second optical transmitter module are not affected by a material of an active component, monolithic integration can be realized, and the dimensions of the first optical transmitter module applicable to environmental detection and the second optical transmitter module applicable to optical communication can be further reduced. In addition, compared with the traditional diffractive optical element (DOC), the first metasurface and the second metasurface may have more diversified optical wave control capabilities, so that the anti-interference ability of the optical detection system can be improved.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
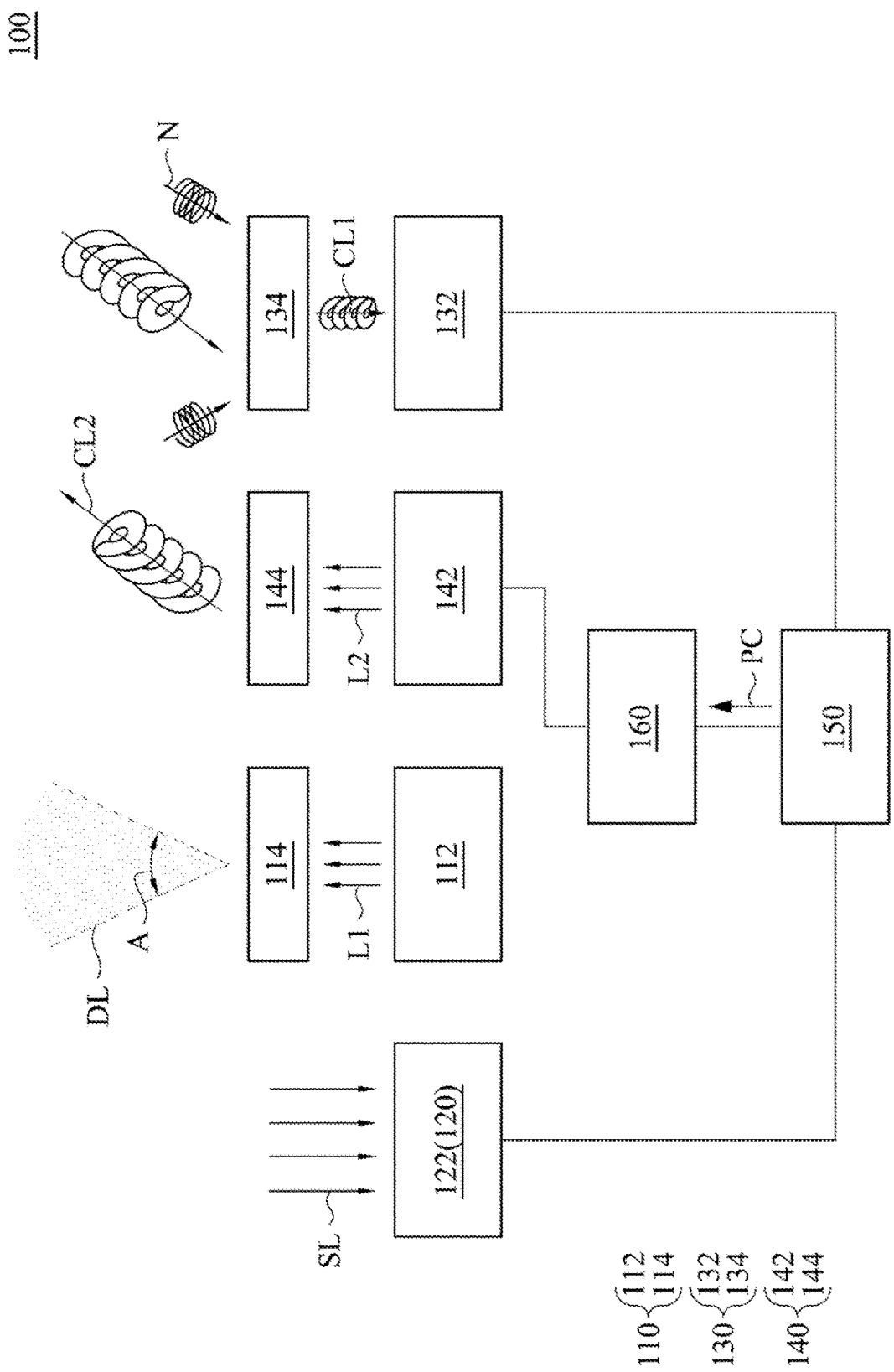
FIG. 1 is a schematic diagram during operation of an optical detection system according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the drawings. The spatially relative terms are intended to encompass different orientations of the device in use or operation in addition to the orientation depicted in the drawings. The apparatus may be otherwise oriented (rotated 90 degrees or at other orientations) and the spatially relative descriptors used herein may likewise be interpreted accordingly.

FIG. 1 is a schematic diagram during operation of an optical detection system 100 according to an embodiment. The optical detection system 100 includes a first optical transmitter module 110, a first optical receiver module 120, a second optical receiver module 130, and a second optical transmitter module 140. The first optical transmitter module 110 is configured to emit detection light, and has a first light transmitter 112 and a first metasurface 114 located above the first light transmitter 112. The first light transmitter 112 includes a photonic crystal surface emitting laser (PCSEL). The first metasurface 114 is configured to increase a scattering angle A of light L1 from the first light transmitter 112 through the first metasurface 114 to form detection light DL; and the detection light DL has the scattering angle A, so that the detection range of the detection light DL is enlarged. The first optical receiver module 120 has a light receiver 122, and is configured to receive signal light SL formed by the detection light DL reflected by external objects. Therefore, the first optical transmitter module 110 and the first optical receiver module 120 enable the optical detection system 100 to perform environmental detection. The second optical receiver module 130 is configured to receive first communication light CL1. In some embodiments, the first communication light CL1 is from another optical detection system. The second optical transmitter module 140 is configured to emit second communication light CL2, and has a second light transmitter 142 and a second metasurface 144 located above the second light transmitter 142. The second communication light CL2 has information of signal light SL and information of the first communication light CL1. The second light transmitter 142 includes a photonic crystal surface emitting laser. The second metasurface 144 is configured to determine the spatial distribution and polarization pattern of the second communication light CL2, so that the second communication light CL2 can be separated from an external optical signal. In some embodiments, the second communication light CL2 may serve as first communication light of other optical detection systems, so that the optical detection system 100 not only can perform environmental detection, but also can realize optical communication. In addition, the photonic crystal surface emitting laser has little temperature dependence, so that the first light transmitter 112 and the second light transmitter 142 can maintain the thermal stability while being miniaturized.

Specifically, the first optical transmitter module 110 has the first light transmitter 112 including the photonic crystal surface emitting laser, and the first metasurface 114 located above the first light transmitter 112, the second optical transmitter module 140 has the second light transmitter 142 including the photonic crystal surface emitting laser, and the second metasurface 144 located above the second light transmitter 142, and the manufacturing process of the metasurfaces and the manufacturing process of the photonic crystal surface emitting lasers may be integrated; therefore, the manufacturing processes of the first optical transmitter module 110 and the second optical transmitter 140 module are not affected by a material of an active component, monolithic integration can be realized, and the dimensions of the first optical transmitter module 110 applicable to environmental detection and the second optical transmitter module 140 applicable to optical communication can be further reduced. In addition, compared with the traditional diffractive optical element (DOC), the first metasurface 114 and the second metasurface 144 may have more diversified optical wave control capabilities, so that the anti-interference ability of the optical detection system 100 can be improved.

In some embodiments, the second optical receiver module 130 may have a light receiver 132 and a third metasurface 134. The third metasurface 134 is configured for the first communication light CL1 to pass through and isolate noise N from the outside. In some embodiments, the first communication light CL1 received by the second optical receiver module 130 and the second communication light CL2 emitted by the second optical transmitter module 140 are optical vortexes, linearly polarized light, circularly polarized light or elliptically polarized light. In this embodiment, the second metasurface 144 shapes light L2 from the second light transmitter 142 into the second communication light CL2, and the second communication light CL2 is an optical vortex. The third metasurface 134 is configured for the first communication light CL1 which is an optical vortex to pass through, so that the second optical receiver module 130 is not affected by the external noise N. Therefore, the optical detection system 100 which realizes an optical communication technology through the second optical receiver module 130 and the second optical transmitter module 140 can avoid the interference of ineffective light beams in the environment.

In addition, the optical detection system 100 may further include an image processor 150. The image processor 150 is electrically connected to the first optical receiver module 120 and the second optical receiver module 130. The first optical receiver module 120 may record the signal light SL and convert the signal light into a digital signal. The image processor 150 is configured to convert the digital signal from the first optical receiver module 120 to a first point cloud diagram. In this embodiment, the image processor 150 may perform deep computation on the digital signal from the first optical receiver module 120 through signal processing to obtain the first point cloud diagram. The image processor 150 may fuse the first point cloud diagram and a second point cloud diagram from the second optical receiver module 130 by an iterative closest point algorithm to generate a fused point cloud diagram PC. The first point cloud diagram, the second point cloud diagram and the fused point cloud diagram PC are 3D point cloud diagrams with spatial information.

In some embodiments, the optical detection system 100 may further include a modulator 160. The modulator 160 is electrically connected to the image processor 150 and the second optical transmitter module 142 of the second optical transmitter module 140. The modulator 160 is configured to code the fused point cloud diagram PC to the second communication light CL2 emitted by the second optical transmitter module 140. In this way, the second communication light CL2 may specifically include information (that is, fused information of the first point cloud diagram converted by the signal light SL and the second point cloud diagram converted by the first communication light CL1) of the fused point cloud diagram PC; and the second communication light CL2 may serve as first communication light of other optical detection systems, so that the optical detection system 100 may transmit point cloud data with spatial information by an optical communication technology.

In conclusion, the optical detection system 100 not only can perform environmental detection, but also can transmit the point cloud data by the optical communication technology; therefore, the optical detection system 100 may be applied to vehicle-to-everything (V2X); and furthermore, compared with the current laser component (for example, a vertical cavity surface emitting laser (VCSEL) applied to the vehicle lighting equipment and a distributed-feedback laser (DFB laser)), the optical detection system 100 using the photonic crystal surface emitting laser as a light source can have miniaturization capability.

Figure 2A:
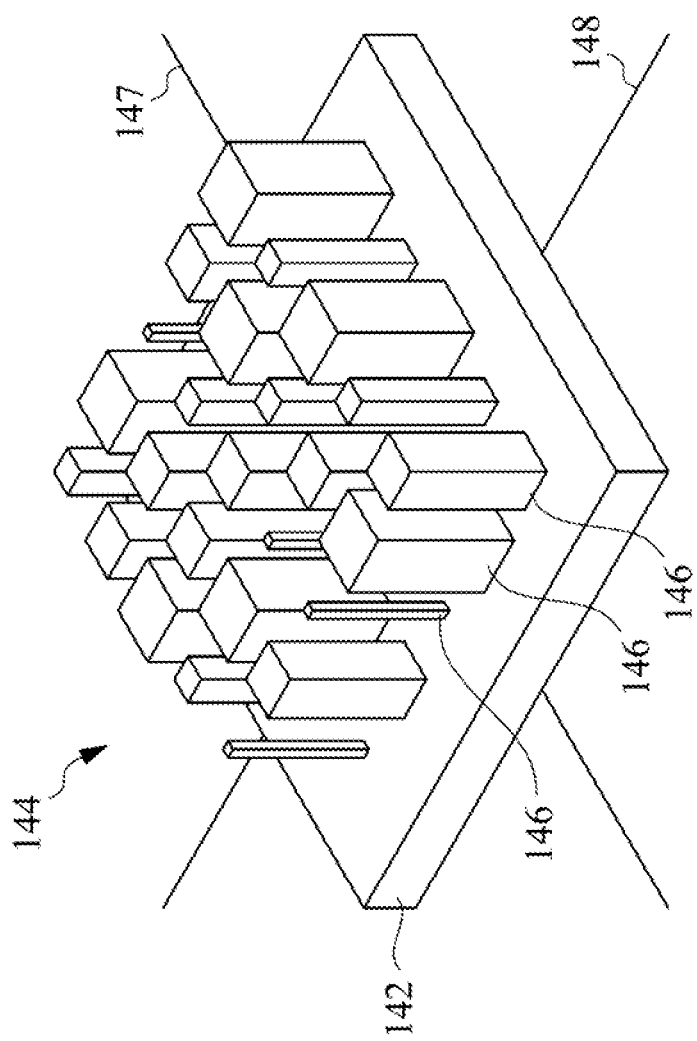
FIG. 2A is a sterogram of a second optical transmitter module in FIG. 1.
Figure 2B:
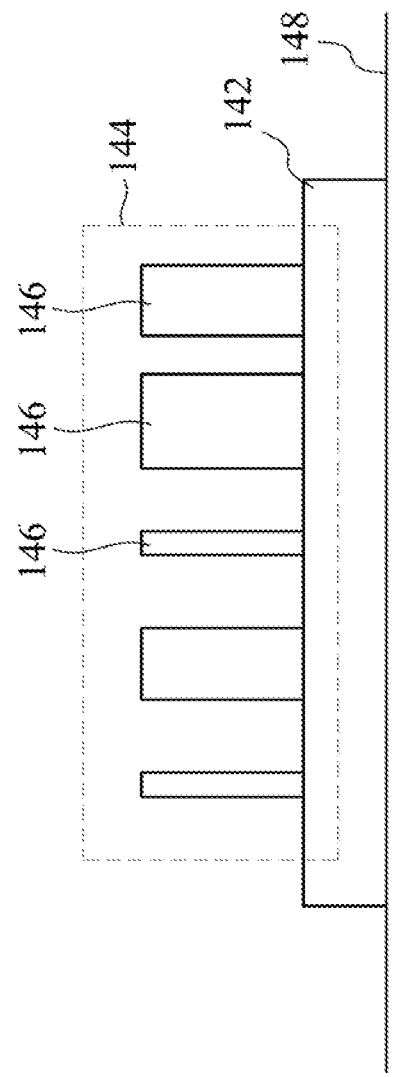
FIG. 2B is a side view of the second optical transmitter module in FIG. 1.

FIG. 2A is a sterogram of a second optical transmitter module 140 in FIG. 1. FIG. 2B is a side view of the second optical transmitter module 140 in FIG. 1. Referring to FIG. 2A and FIG. 2B, the second optical transmitter module 140 has a second light transmitter 142 and a second metasurface 144 located above the second light transmitter 142. The second metasurface 144 may have a plurality of meta-atoms 146. These meta-atoms 146 may be shaped like cylinders, tetragonal prisms or rectangular prisms, and have tetragonal lattices or hexagonal lattices. In this embodiment, the meta-atoms 146 of the second metasurface 144 are shaped like tetragonal prisms and have tetragonal lattices.

Figure 2C:
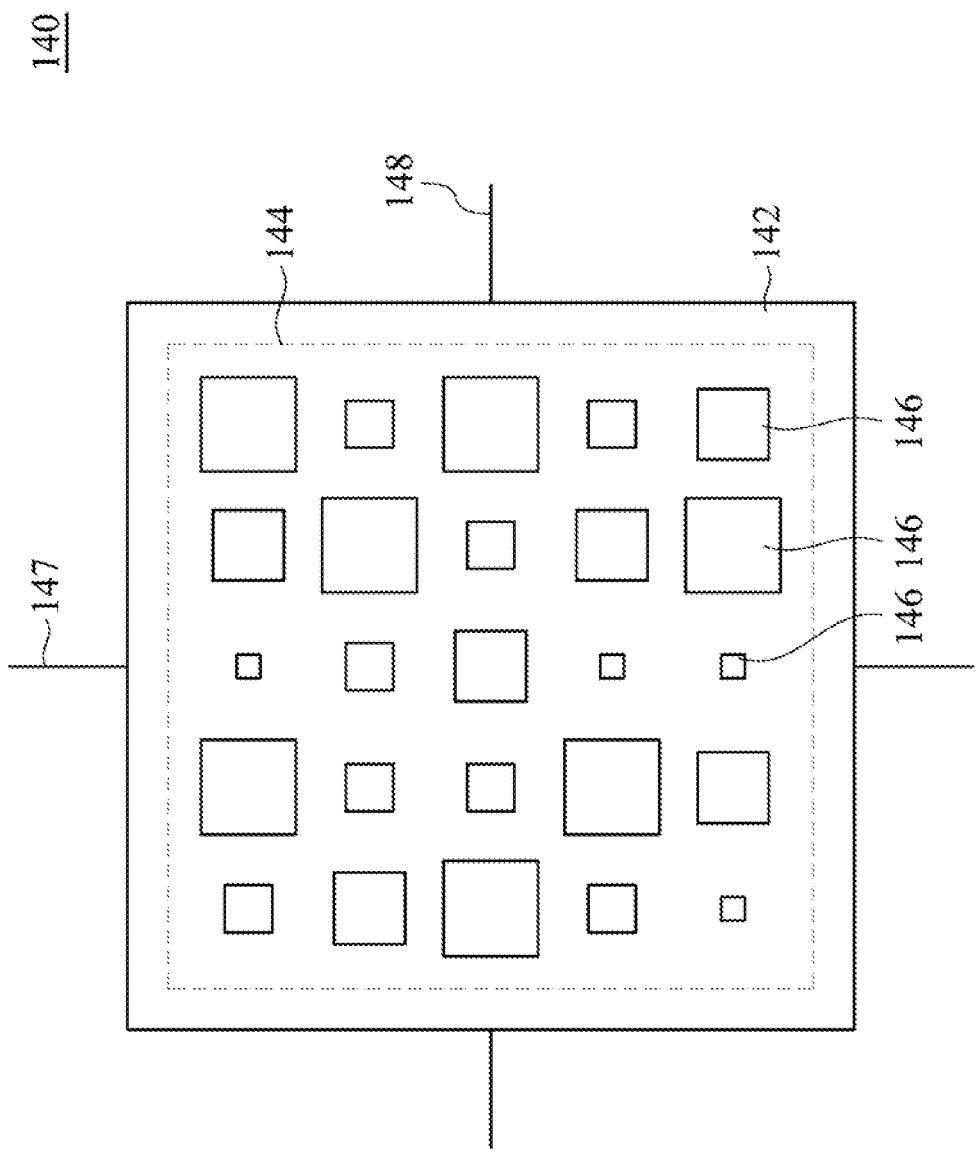
FIG. 2C is a top view of the second optical transmitter module in FIG. 1.

FIG. 2C is a top view of the second optical transmitter module 140 in FIG. 1. Referring to FIG. 2A and FIG. 2C, top surfaces of these meta-atoms 146 may have different area. In addition, the second optical transmitter module 140 has an X electrode 147 and a Y electrode 148 that are located below the second light transmitter 142. The X electrode 147 and the Y electrode 148 are electrically connected to the second light transmitter 142. In some embodiments, the X electrode 147 and the Y electrode 148 are electrically connected to other light transmitters, so that the second optical transmitter module 140 can have a light transmitter array.

Figure 3:
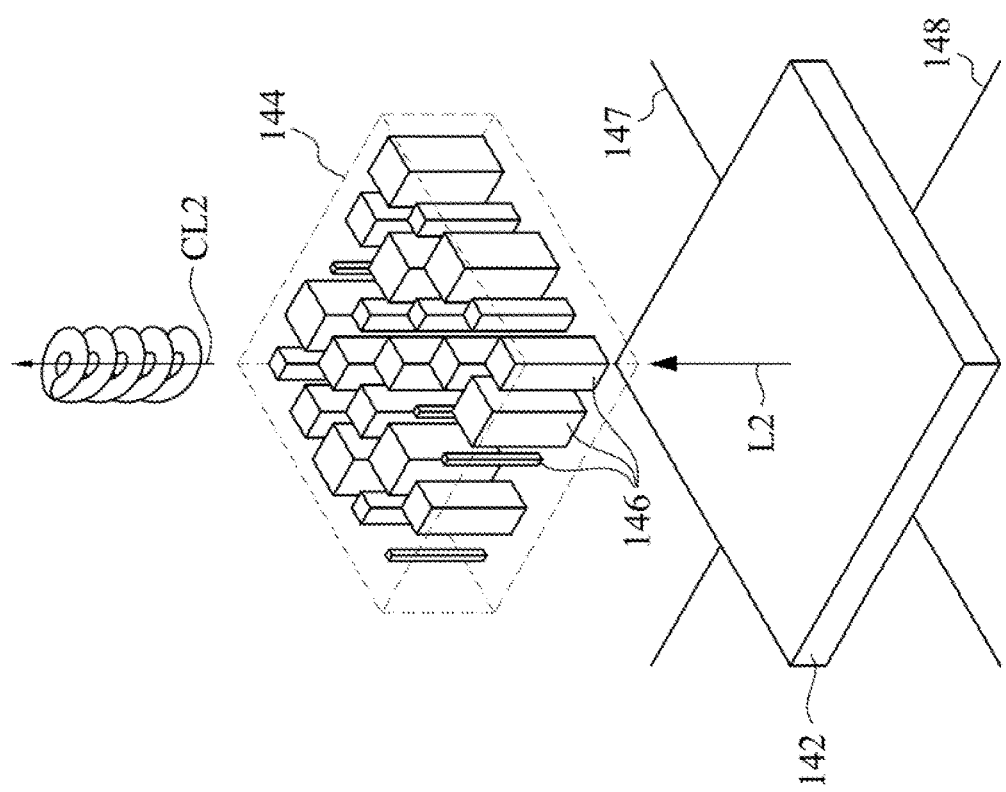
FIG. 3 is a schematic diagram during operation of the second optical transmitter module in FIG. 1 and FIG. 2A.

FIG. 3 is a schematic diagram during operation of the second optical transmitter module 140 in FIG. 1 and FIG. 2A. As shown in the figure, the second optical transmitter module 140 is configured to emit second communication light CL2, and has a second light transmitter 142 and a second metasurface 144 located above the second light transmitter 142. The second metasurface 144 may have a plurality of meta-atoms 146. In some embodiments, the spatial distribution of the second communication light CL2 may be designed by computer generated holography (CGH), and the geometric figure and the arrangement mode of the meta-atoms 146 of the second metasurface 144 are constructed according to the ideal far-field pattern. In this embodiment, the meta-atoms 146 of the second metasurface 144 are shaped like tetragonal prisms and have tetragonal lattices; and top surfaces of these meta-atoms 146 may have different area, so that the second communication light CL2 may be an optical vortex.

Figure 4:
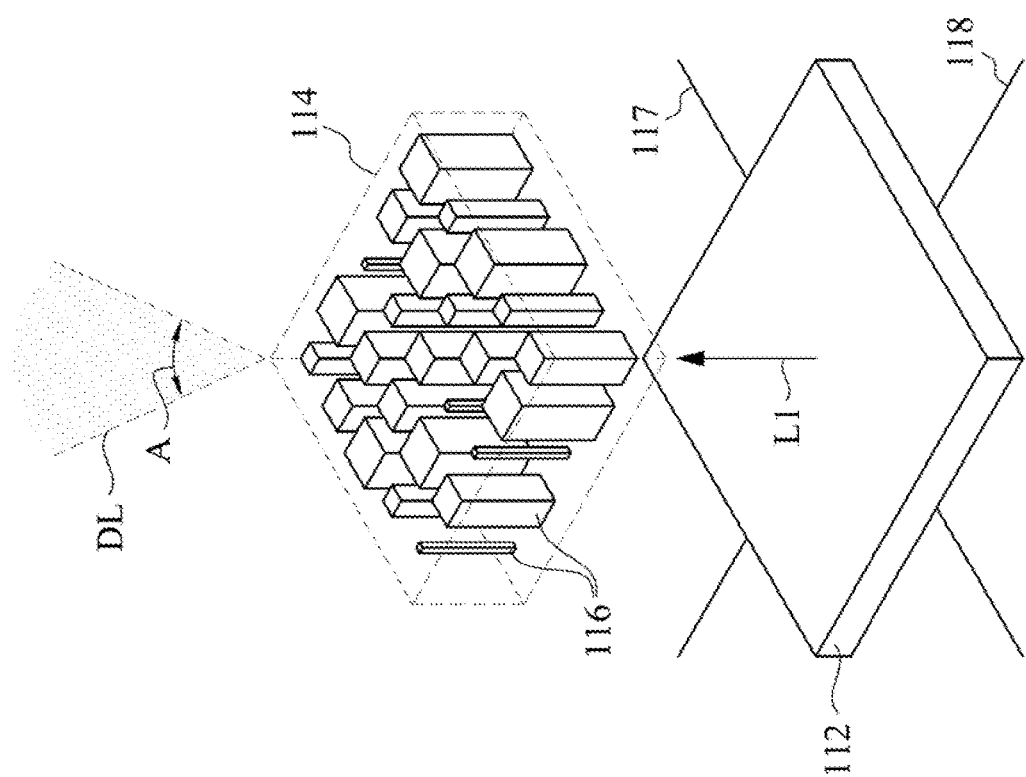
FIG. 4 is a schematic diagram during operation of a first optical transmitter module in FIG. 1.

FIG. 4 is a schematic diagram during operation of the first optical transmitter module 110 in FIG. 1. As shown in the figure, the first optical transmitter module 110 is configured to emit detection light, and has a first light transmitter 112 and a first metasurface 114 located above the first light transmitter 112. The first metasurface 114 may have a plurality of meta-atoms 116. In some embodiments, the spatial distribution of detection light DL may be designed by computer generated holography, and the geometric figure and the arrangement mode of the meta-atoms 116 of the first metasurface 114 are constructed according to the ideal far-field pattern. The geometric figure and the arrangement mode of the meta-atoms 116 may be different from the geometric figure and the arrangement mode of the meta-atoms 146 in FIG. 3. In this embodiment, the detection light DL has a scattering angle A, and the scattering angle is larger than a scattering angle of light L1 from the first light transmitter 112. In addition, the first optical transmitter module 110 has an X electrode 117 and a Y electrode 118 that are located below the first light transmitter 112. The X electrode 117 and the Y electrode 118 are electrically connected to the first light transmitter 112. In some embodiments, the X electrode 117 and the Y electrode 118 are electrically connected to other light transmitters, so that the first optical transmitter module 110 can have a light transmitter array.

Figure 5:
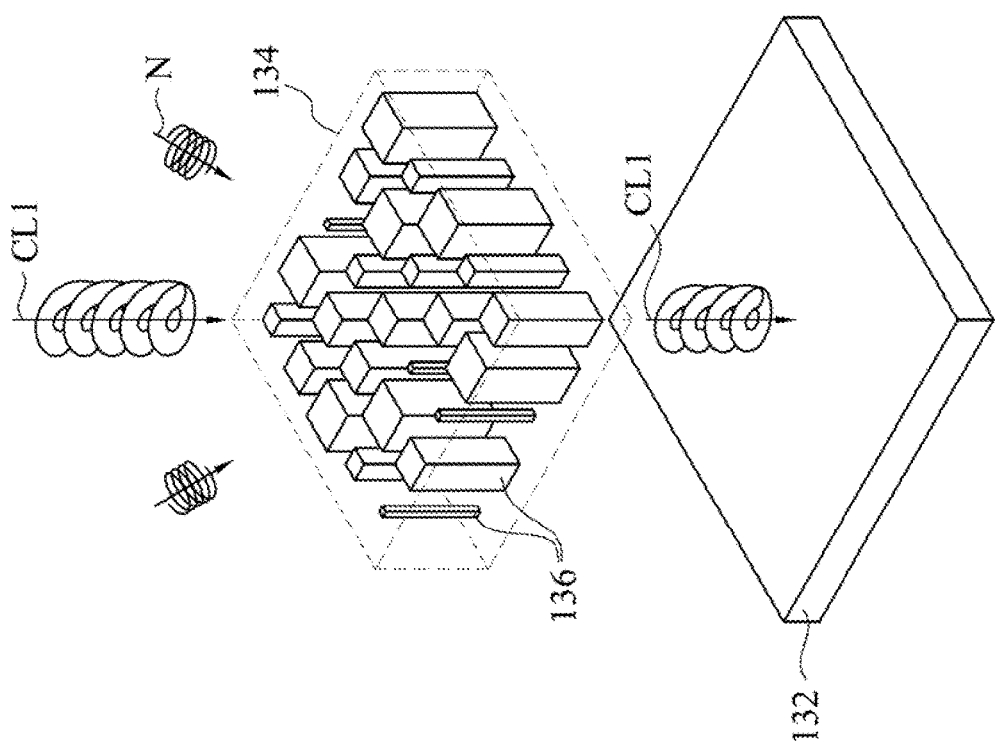
FIG. 5 is a schematic diagram during operation of a second optical receiver module in FIG. 1.

FIG. 5 is a schematic diagram during operation of the second optical receiver module 130 in FIG. 1. As shown in FIG. 5, the second optical receiver module 130 is configured to receive first communication light CL1, and has a light receiver 132 and a third metasurface 134. The third metasurface 134 may have a plurality of meta-atoms 136. The geometric figure and the arrangement mode of the meta-atoms 136 may be constructed according to the optical characteristic of the first communication light CL1, so that the first communication light CL1 can pass through the third metasurface 134, and the third metasurface 134 has the functions of polarization, filtering and selection, thereby isolating noise N from the outside and with other polarization patterns. In some embodiments, the first communication light CL1 may be an optical vortex from other optical detection systems. In addition, the third metasurface 134 may be different from the second metasurface 144 in FIG. 3, or may be different from the first metasurface 114 in FIG. 4.

It should be understood that the connection relationship, materials and functions of the elements that have been described will not be repeated. An operating method of an optical detection system is described in the following description.

Figure 6:
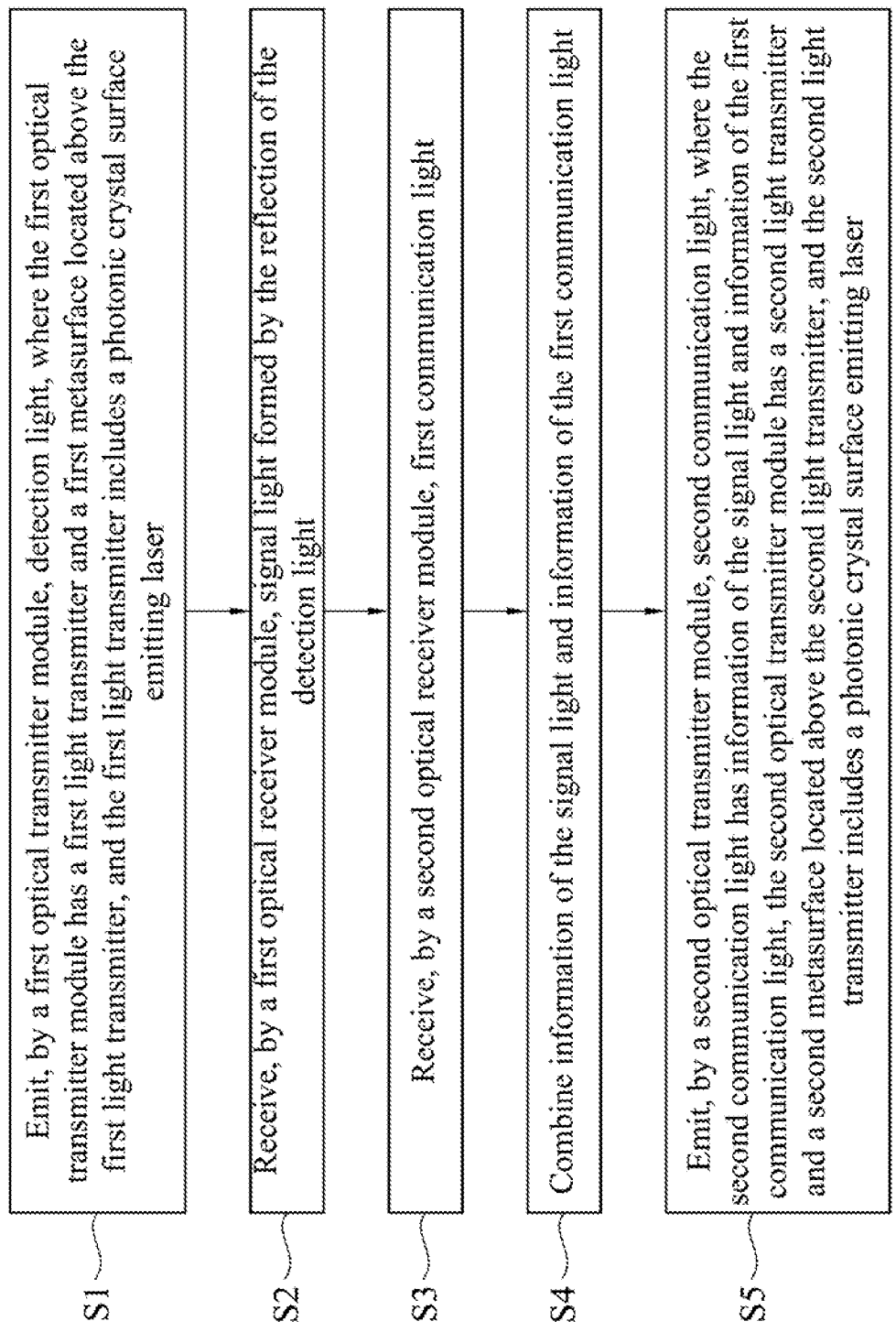
FIG. 6 is a flowchart of an operating method of an optical detection system according to an embodiment of the present disclosure.

FIG. 6 is a flowchart of an operating method of an optical detection system (for example, the above optical detection system 100) according to an embodiment of the present disclosure. Referring to FIG. 6 and FIG. 1, in step S1, detection light DL is emitted by a first optical transmitter module 110, where the first optical transmitter module 110 has a first light transmitter 112 and a first metasurface 114 located above the first light transmitter 112, and the first light transmitter 112 includes a photonic crystal surface emitting laser. Then, in step S2, signal light SL formed by the reflection of the detection light DL is received by the first optical receiver module 120. In some embodiments, the signal light SL may be converted to a first point cloud diagram by an image processor 150. Then in step S3, the first communication light CL1 is received by a second optical receiver module 130. Then, in step S4, information of the signal light SL and information of the first communication light CL1 are combined. (For example, the information of the signal light SL may be information of the first point cloud diagram, and the information of the first communication light CL1 may be information of a second point cloud diagram.) Then, in step S5, second communication light CL2 is emitted by a second optical transmitter module 140, where the second communication light CL2 has the information of the signal light SL and the information of the first communication light CL1 (that is, in some embodiments, the second communication light CL2 may have the fused information of the first point cloud diagram converted by the signal light SL and the second point cloud diagram converted by the first communication light CL1), the second optical transmitter module 140 has a second light transmitter 142 and a second metasurface 144 located above the second light transmitter 142, and the second light transmitter 142 includes a photonic crystal surface emitting laser.

The operating method of the optical detection system 100 is not limited to the above steps S1 to S5. In some embodiments, the operating method of the optical detection system 100 may further include other steps between any two of the above steps. In addition, steps S1 to S5 may respectively include a plurality of detailed steps.

In some embodiments, the step that the information of the signal light SL and the information of the first communication light CL1 are combined includes: a digital signal from the first optical receiver module 120 is converted to the first point cloud diagram by the image processor 150, the first point cloud diagram and the second point cloud diagram from the second optical receiver module 130 are combined by an iterative closest point algorithm to generate the fused point cloud diagram PC, where the iterative closest point algorithm may enable a root-mean-square error (RMSE) between the first point cloud diagram and the second point cloud diagram to be less than a preset threshold, thereby ensuring that the fused point cloud diagram PC can avoid information distortion.

In addition, the step that second communication light CL2 is emitted by the second optical transmitter module 140 may include: the fused point cloud diagram PC is coded, by a modulator 160, to the second communication light CL2 emitted by the second optical transmitter module 140. In some embodiments, the step that second communication light CL2 is emitted by a second optical transmitter module 140 may enable the second communication light CL2 to serve as first communication light of another optical detection system. In this way, the second communication light CL2 not only may include the information of the fused point cloud diagram PC, but also may serve as the first communication light of the another optical detection system, so that the optical detection system 100 can transmit cloud point data with spatial information by the optical communication technology, and can be applied to the vehicle-to-everything.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An optical detection system, comprising:
   a first optical transmitter module, configured to emit detection light, and having a first light transmitter and a first metasurface located above the first light transmitter, wherein the first light transmitter comprises a photonic crystal surface emitting laser, and the first metasurface is configured to increase a scattering angle of light from the first light transmitter through the first metasurface to form the detection light;
   a first optical receiver module, configured to receive a first signal light formed by a reflection of the detection light;
   a second optical receiver module, configured to receive first communication light; and
   a second optical transmitter module, configured to emit second communication light, and having a second light transmitter and a second metasurface located above the second light transmitter, wherein the second communication light has information of the first signal light and information of the first communication light, the second light transmitter comprises a photonic crystal surface emitting laser, and the second metasurface is configured to determine a spatial distribution and polarization pattern of the second communication light.

2. The optical detection system of claim 1, wherein the second optical receiver module has a third metasurface, and the third metasurface is configured for the first communication light to pass through.

3. The optical detection system of claim 2, wherein each of the first metasurface, the second metasurface and the third metasurface has a plurality of meta-atoms; and these meta-atoms are shaped like cylinders, tetragonal prisms or rectangular prisms, and have tetragonal lattices or hexagonal lattices.

4. The optical detection system of claim 2, wherein the third metasurface is configured to isolate a noise from the second optical receiver module.

5. The optical detection system of claim 2, wherein the first optical receiver module has no metasurface configured to filter the first signal light.

6. The optical detection system of claim 1, further comprising:
   an image processor, electrically connected to the first optical receiver module and the second optical receiver module, and configured to convert a digital signal from the first optical receiver module to a first point cloud diagram and fuse the first point cloud diagram and a second point cloud diagram from the second optical receiver module to generate a fused point cloud diagram.

7. The optical detection system of claim 6, further comprising:
   a modulator, electrically connected to the image processor and the second optical transmitter module, and configured to code the fused point cloud diagram to the second communication light emitted by the second optical transmitter module.

8. The optical detection system of claim 1, wherein the first communication light received by the second optical receiver module and the second communication light emitted by the second optical transmitter module are an optical vortex, linearly polarized light, circularly polarized light or elliptically polarized light.

9. An operating method of an optical detection system, comprising:
   emitting, by a first optical transmitter module, detection light, wherein the first optical transmitter module has a first light transmitter and a first metasurface located above the first light transmitter, and the first light transmitter comprises a photonic crystal surface emitting laser;
   receiving, by a first light receive module, signal light formed by a reflection of the detection light;
   receiving, by a second optical receiver module, first communication light;
   combining information of the signal light and information of the first communication light; and
   emitting, by a second optical transmitter module, second communication light, wherein the second communication light has the information of the signal light and the information of the first communication light, the second optical transmitter module has a second light transmitter and a second metasurface located above the second light transmitter, and the second light transmitter comprises a photonic crystal surface emitting laser.

10. The operating method of an optical detection system of claim 9, wherein combining information of the signal light and information of the first communication light comprises: converting, by an image processor, a digital signal from a first optical receiver module to a first point cloud diagram, and fusing the first point cloud diagram and a second point cloud diagram from the second optical receiver module to generate a fused point cloud diagram.

11. The operating method of an optical detection system of claim 10, wherein emitting, by a second optical transmitter module, second communication light comprises: coding, by a modulator, the fused point cloud diagram to the second communication light emitted by the second optical transmitter module.

12. The operating method of an optical detection system of claim 9, wherein emitting, by a second optical transmitter module, second communication light enables the second communication light to serve as first communication light of another optical detection system.

13. A vehicle communication system, comprising:
a vehicle; and
an optical detection system located in the vehicle, comprising:
a first optical transmitter module, configured to emit detection light, and having a first light transmitter and a first metasurface located above the first light transmitter, wherein the first light transmitter comprises a photonic crystal surface emitting laser, and the first metasurface is configured to increase a scattering angle of light from the first light transmitter through the first metasurface to form the detection light;
a first optical receiver module, configured to receive first signal light formed by a reflection of the detection light;
a second optical receiver module, configured to receive first communication light; and
a second optical transmitter module, configured to emit second communication light, and having a second light transmitter and a second metasurface located above the second light transmitter, wherein the second communication light has information of the first signal light and information of the first communication light, the second light transmitter comprises a photonic crystal surface emitting laser, and the second metasurface is configured to determine a spatial distribution and polarization pattern of the second communication light.

14. The vehicle communication system of claim 13, wherein the second optical receiver module has a third metasurface, and the third metasurface is configured for the first communication light to pass through.

15. The vehicle communication system of claim 14, wherein each of the first metasurface, the second metasurface and the third metasurface has a plurality of meta-atoms; and these meta-atoms are shaped like cylinders, tetragonal prisms or rectangular prisms, and have tetragonal lattices or hexagonal lattices.

16. The optical detection system of claim 14, wherein the third metasurface is configured to isolate a noise from the second optical receiver module.

17. The optical detection system of claim 14, wherein the first optical receiver module has no metasurface configured to filter the first signal light.

18. The vehicle communication system of claim 13, further comprising:
an image processor, electrically connected to the first optical receiver module and the second optical receiver module, and configured to convert a digital signal from the first optical receiver module to a first point cloud diagram and fuse the first point cloud diagram and a second point cloud diagram from the second optical receiver module to generate a fused point cloud diagram.

19. The vehicle communication system of claim 18, further comprising:
a modulator, electrically connected to the image processor and the second optical transmitter module, and configured to code the fused point cloud diagram to the second communication light emitted by the second optical transmitter module.

20. The vehicle communication system of claim 13, wherein the first communication light received by the second optical receiver module and the second communication light emitted by the second optical transmitter module are an optical vortex, linearly polarized light, circularly polarized light or elliptically polarized light.

* * * * *